H. E. MEAD.
PHOTOGRAPHIC CAMERA LENS.

No. 180,776. Patented Aug. 8, 1876.

Witnesses.
Francis H. Schell
B. Morgan

Inventor:
Henry E. Mead

UNITED STATES PATENT OFFICE.

HENRY E. MEAD, OF JERSEY CITY, NEW JERSEY.

IMPROVEMENT IN PHOTOGRAPHIC CAMERA-LENSES.

Specification forming part of Letters Patent No. 180,776, dated August 8, 1876; application filed May 8, 1876.

*To all whom it may concern:*

Be it known that I, HENRY E. MEAD, of Jersey City, county of Hudson, State of New Jersey, United States of America, have invented a Photographic Camera-Lens, of which the following is a specification:

This invention consists of a camera-lens, the combinations in which shall be composed of but three lenses, and which shall have no two or more surfaces of said lenses cemented together.

In my improved lens, which is designed for a portrait-lens, the front combination consists of a meniscus lens of crown-glass and a plano-concave lens of flint glass, the two being sufficiently over-corrected for actinic rays as to be finally corrected by the rear lens, which is a single meniscus, of crown-glass of different density from the crown-glass used in the front combination.

The purpose gained by the following-described arrangement is, first, the production of a lens having the advantage of cheapness, as compared with the combinations in general use, four lenses being generally employed; second, it having no cementing material to deteriorate with age, climatic changes, or imperfect workmanship in the cementing.

To enable others skilled in the arts to make and use the same, I will now describe its construction, reference being had to the annexed drawings, in which—

Figure 1:
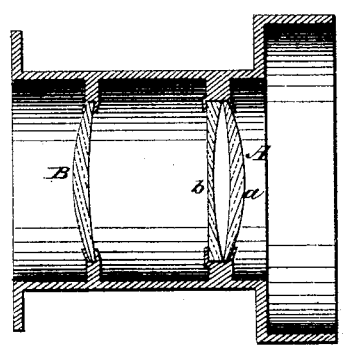
Figure 2:
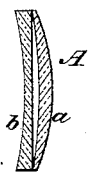

Figure 1 represents a vertical cross-section, and Fig. 2 a modification of the same.

A represents the front lens of the combination, and is composed of a meniscus lens, $a$, and a plano-concave lens, $b$, the meniscus lens having its convex surface outward or toward the object to be photographed, and the plano-concave having either its concave surface, as shown in Fig. 1, or plane surface, as shown in Fig. 2, resting against the concave side of the meniscus lens $a$, either position of the plano-concave lens producing the purpose sought, though I have preference for the position shown in Fig. 1. B is the rear lens, distant about its diameter from the front lens, and consists of one meniscus lens, having its convex surface toward the ground glass of the camera-box.

The radius of curvature in the front meniscus lens $a$ is 3.07 inches for the convex surface, and 13.213 inches for the concave surface. The radius for concave surface of lens $b$ is 7 inches. The radius of concave surface of the rear lens B is 13.213 inches, and for the convex surface 2.769 inches. The combined focuses from the back of rear lens is 5.5+ inches. These radii will be varied slightly to suit the purposes of larger lenses and longer focus, the data given being for plates of four and a fourth by five and a half inches, with lenses of one and a fourth inch in diameter.

By using the meniscus form of lens $a$ with the plano-concave lens $b$ I obtain a larger area and greater depth of sharp image than by using a double-convex lens in place of the meniscus lens, or a double-concave lens in place of the plano-concave.

Having thus fully described my invention, what I claim as new, and desire to secure by Letters Patent, is—

The combination of the meniscus lens $a$ and plano-concave lens $b$ with the meniscus lens B, substantially as described, and for the purpose specified.

HENRY EDWIN MEAD.

Witnesses:
 R. H. ABERNETHY,
 T. L. LIEB.